J. B. KNUDSEN.
PACKLESS SWING JOINT.
APPLICATION FILED NOV. 3, 1916.
1,270,172. Patented June 18, 1918.
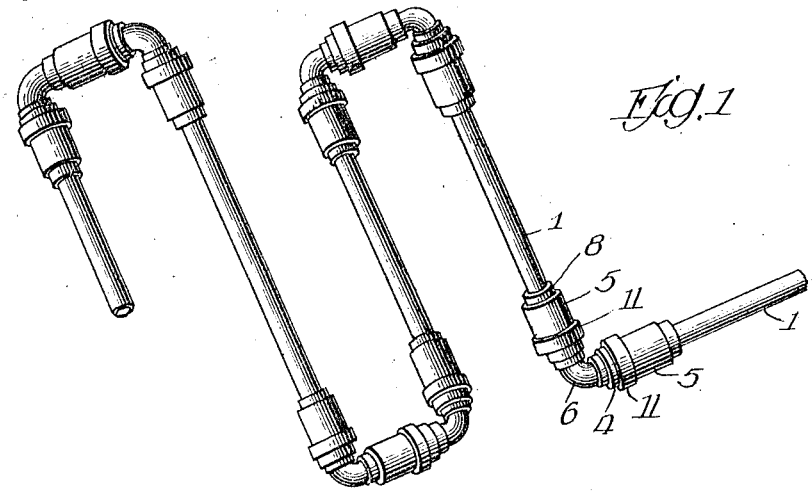
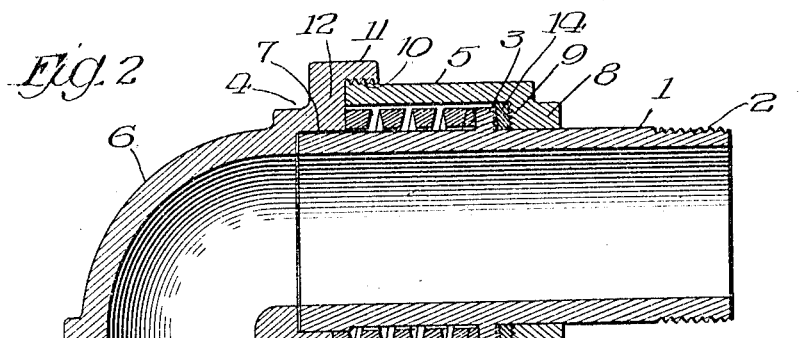
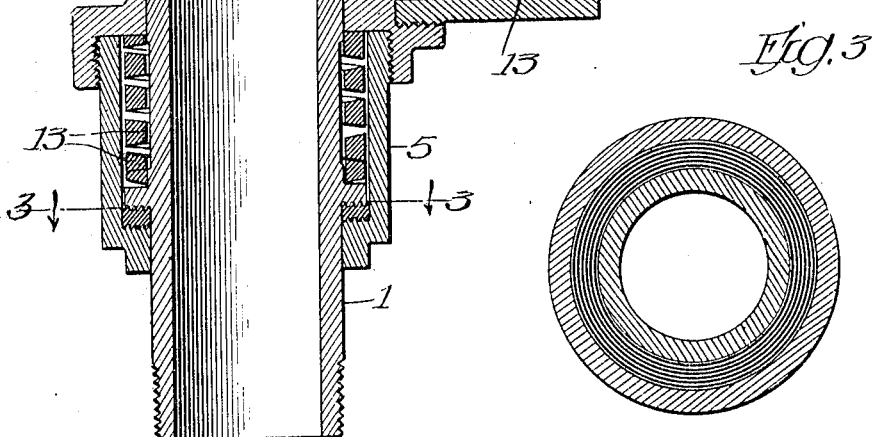
INVENTOR.
Jacob B. Knudsen
WITNESS:
By ATTORNEYS.

UNITED STATES PATENT OFFICE.

JACOB B. KNUDSEN, OF CHICAGO, ILLINOIS.

PACKLESS SWING-JOINT.

1,270,172.   Specification of Letters Patent.   Patented June 18, 1918.

Application filed November 3, 1916. Serial No. 129,307.

*To all whom it may concern:*

Be it known that I, JACOB B. KNUDSEN, a citizen of the United States, residing at Chicago, in the county of Cook and State of Illinois, have invented new and useful Improvements in Packless Swing-Joints, of which the following is a full, clear, concise, and exact description, reference being had to the accompanying drawing, forming a part of this specification.

My invention relates to improvements in swing joints for pipes and the like, and has for one of its objects the provision of a swing joint which, while permitting one section of the pipe to swing freely upon the other, will prevent the escape through the joint of the contents of the pipe.

My invention is particularly adaptable for use in connection with pipes conveying volatile liquid, high pressure steam, and the like.

For the purpose of disclosing my invention I have illustrated one embodiment thereof in the accompanying drawings. In said drawings—

Figure 1 is a perspective view of a pipe section having a number of my swing joints therein;

Fig. 2 is a transverse section of a double swing joint of my construction; and

Fig. 3 is a sectional view on the line 3—3 of Fig. 2.

In the drawings, the pipe section 1, which may be a continuous length of pipe or merely a sectional portion having a threaded end 2 by which it may be connected by suitable coupler to the pipe, is provided with an annular squared flange 3 spaced from the end of the pipe. The end of the pipe fits within a two-part swivel coupler 4 comprising the swivel draw member 5 and the coupling member 6. In the drawing the coupling member 6 is shown as an elbow, but it is obvious that, if desired, it may take any other form, such, for instance, as a straight extension. The end of the pipe section 1 fits in an enlarged bore 7 of the coupler, which bore is of sufficient diameter to permit the inner surface of the pipe to lie flush with the inner surface of the coupler, so that there will be a continuous passage formed, with no ridges or shoulders to obstruct the passage of the fluid or other material conducted by the pipe. This bore 7 not only permits the two inner surfaces to be flush, but also forms a bearing for the inner end of the pipe. The swivel member 5 surrounds the pipe section 1 and is of considerably greater diameter than the pipe section throughout the greater part of its length; being drawn in, however, at 8 to fit more or less tightly about the pipe and form a squared shoulder 9. Its upper end is externally screw-threaded at 10 and engages the internally screw-threaded collar 11 formed integrally with the coupling member 6 and on an annular flange 12 on said coupling member. Interposed between the flange 12, which forms a shoulder, and the shoulder 9 is an expansion coiled spring 13 which forces the shoulder 3 against the shoulder 9, making a tight rotatable joint at this point. If desired, in order to reduce friction, a softer metal ring 14 is interposed between the shoulder 3 and the shoulder 9, the two shoulders having formed on their faces annular concentric rings which fit in grooves in the ring 14, which, while making a tight joint, does not interfere with the free rotation of the members. This softer metal is preferably formed of an alloy comprising 50 per cent. copper and 50 per cent. lead. This alloy is considerably harder than Babbitt metal and at the same time is sufficiently softer than brass or iron, from which pipes are usually made, so that the concentric rings on the shoulders 3 and 9 will bite into the ring 14 to form practically a ground joint.

Also, especially where the pipes are used as conduits for high pressure steam, the spring 13 is a cast metal spring, as I have found that such a spring will not lose its elasticity under the influence of extreme heat.

The action of this joint is apparent. The spring 13, tending to force the coupling member 6 and the pipe section 1 apart, forces the shoulder 3 into intimate engagement with the ring 14 and the ring 14 into intimate engagement with the shoulder 9 on the swivel member, thereby forming a packless tight joint, which is air-tight and proof against the action of acids, and the like.

It will also be noted that the pipe section 1 has a double bearing surface for its rotation. Its inner end has a bearing in the annular channel 7 and beyond the shoulder 14 the pipe has a bearing in that portion 8 of the swivel immediately surrounding the pipe.

Having thus described my invention, what I claim as new and desire to secure by Letters Patent, is:

1. A swing joint for pipes comprising a hollow coupling having an enlarged bore at its end, a pipe section having its end fitting within said enlarged bore, with its inner surface flush with the inner surface of the coupling, the enlarged bore forming a bearing for the inner end of the pipe section, an annular squared flange on said pipe section spaced from the end thereof, a hollow swivel member of greater diameter than the pipe section fitting over said pipe section and flange and having one end drawn in to intimately surround the pipe section, a squared shoulder formed on said drawn-in portion, the opposite faces of said pipe section, flange and squared shoulder having concentric grooves formed therein, a ring of softer metal interposed between said faces, an annular flange on the coupling member forming a shoulder and having a threaded, integrally formed collar thereon engaging the threaded portion of the swivel member, and a spring surrounding said pipe section, surrounded by said swivel member and interposed between the shoulder on the coupling member and the squared flange on the pipe section to force one of the faces of said pipe section flange toward the squared shoulder on the swivel member, the contracted end of said swivel member forming an additional bearing for the pipe section beyond the annular flange thereon.

2. A swing joint for pipes comprising a hollow coupling having an enlarged bore at its ends, a pipe section having its end fitting within said enlarged bore, with its inner surface flush with the inner surface of the hollow coupling, the enlarged bore forming a bearing for the inner end of the pipe section, an annular squared flange on said pipe section spaced from the end thereof, a hollow swivel member of greater diameter than the pipe section fitting over said pipe section and flange and having one end drawn in to intimately surround the pipe, a squared shoulder formed on said drawn-in portion, a friction-reducing ring of softer metal than the pipe and swivel member surrounding the pipe and interposed between the flange on the pipe section and the flange on the swivel member, an annular flange on the coupling member forming a shoulder and having a threaded, integrally formed collar thereon engaging the threaded portion on the swivel member, and a spring surrounding said pipe section, surrounded by said swivel member and interposed between said flange on the coupler and the flange on the pipe section to force one of the faces of the flange on the pipe section and the squared shoulder on the swivel member into engagement with said ring, the contracted end of said swivel member forming an additional bearing for the pipe section beyond the annular flange thereon.

In witness whereof, I have hereunto subscribed my name.

JACOB B. KNUDSEN.

Copies of this patent may be obtained for five cents each, by addressing the "Commissioner of Patents, Washington, D. C."